United States Patent [19]
Jerro et al.

[11] Patent Number: 5,289,794
[45] Date of Patent: Mar. 1, 1994

[54] MAGNETICALLY ALIGNED TRANSMISSION SHIFT INDICATOR

[75] Inventors: Harlan D. Jerro, Colfax, La.; James L. Kohler; Steven G. Skiver, both of Kokomo, Ind.; Timothy J. Candy, Williamston; Donald F. Wildfong, Flint, both of Mich.; Morgan D. Murphy, Kokomo, Ind.

[73] Assignee: Delco Electronics Corporation, Kokomo, Ind.

[21] Appl. No.: 948,567

[22] Filed: Sep. 23, 1992

[51] Int. Cl.⁵ .................................................. G09F 9/40
[52] U.S. Cl. .................................... 116/28.1; 116/281; 116/DIG. 20
[58] Field of Search .................. 116/28.1, 204, 281, 116/282, 283, DIG. 20; 74/500.5, 501.5 R

[56] References Cited
U.S. PATENT DOCUMENTS

| | | | |
|---|---|---|---|
| 2,925,061 | 2/1960 | Thornburgh et al. | 116/DIG. 20 X |
| 3,830,192 | 8/1974 | Ronewicz et al. | 116/28.1 |
| 4,519,266 | 5/1985 | Reinecke | 74/471 X |
| 4,550,675 | 11/1985 | Lansinger et al. | 116/28.1 |
| 4,554,422 | 11/1985 | Embrey et al. | 200/61.91 |
| 4,782,782 | 11/1988 | Nill | 116/28.1 |
| 4,788,881 | 12/1988 | Owen et al. | 74/500.5 |
| 4,878,453 | 11/1989 | Inoue et al. | 116/288 |
| 5,070,808 | 12/1991 | Poskie | 116/28.1 |

Primary Examiner—William A. Cuchlinski, Jr.
Assistant Examiner—W. Morris Worth
Attorney, Agent, or Firm—Kevin M. Hinman

[57] ABSTRACT

A gear range indicator for use with automatic transmissions which is remote from the shift mechanism yet requires minimal adjustment to be made to the mechanical linkage to compensate for variations in the position of the display relative to the shift mechanism. This gear range indicator used has magnetic biasing means to position a pointer to the appropriate transmission gear range symbol on the display.

13 Claims, 3 Drawing Sheets

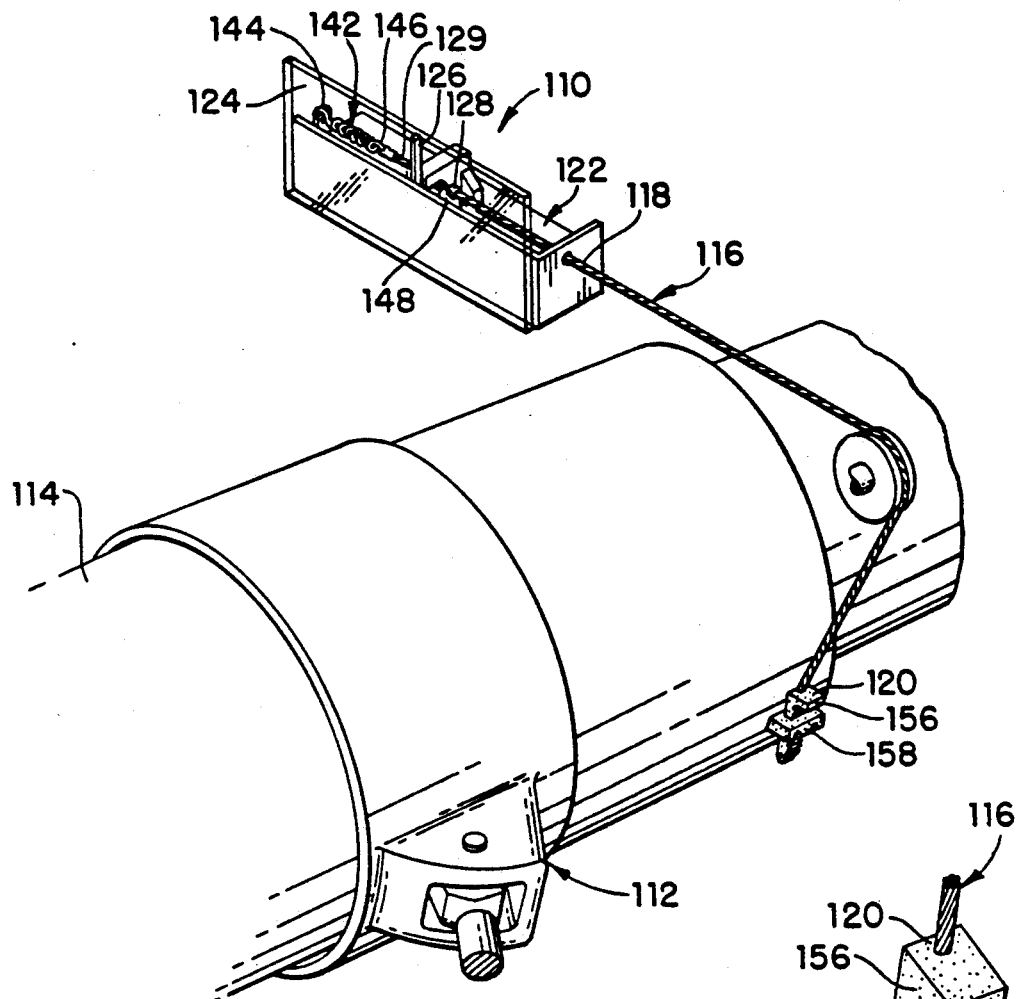
Fig. 5
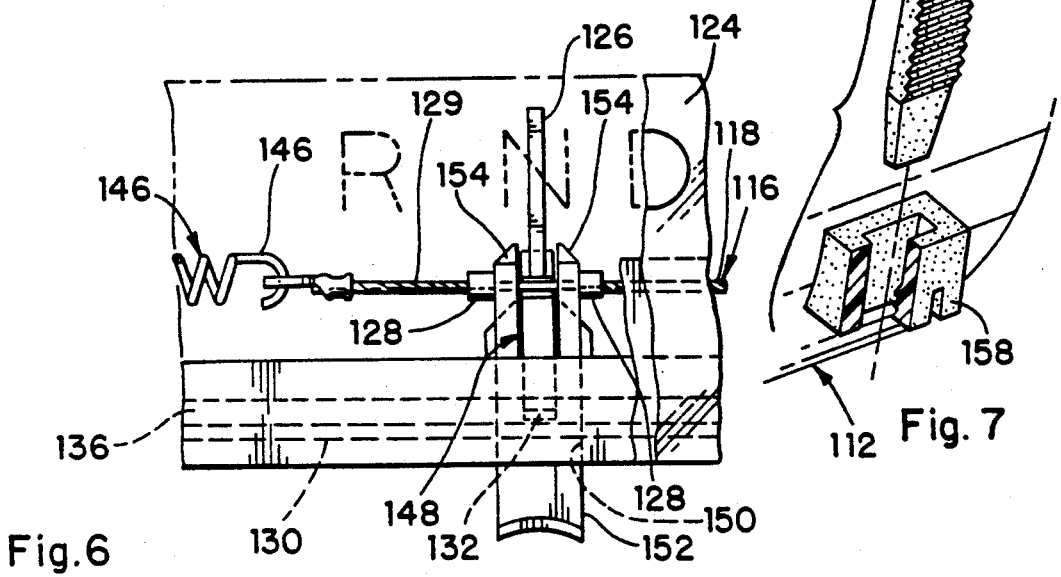
Fig. 6
Fig. 7

5,289,794

MAGNETICALLY ALIGNED TRANSMISSION SHIFT INDICATOR

TECHNICAL FIELD

This invention relates to gear range indicators for automatic transmissions in motor vehicles. More particularly, this invention relates to dashboard mounted indicators linked to a shift mechanism through a mechanical linkage.

BACKGROUND OF THE INVENTION

Associated with an automatic transmission installed in a vehicle is a gear range indicator which displays the gear range selected by a vehicle operator using a shift mechanism.

Prior art gear range indicators commonly rely exclusively on adjustment of the effective length of a cable connecting the indicator with the shift mechanism to compensate for variations in relative location between the indicator and the shift mechanism attaching point. One method of adjustment is to pull on the cable until a desired alignment between indicated gear range and shift mechanism position is achieved, and then fixing the cable to the shift mechanism. An alternative adjustment method provides a rotatable threaded member, similar to a turnbuckle, between the shift mechanism and the gear range indicator for adjusting the effective length of the cable. One such adjuster is shown in U.S. Pat. No. 4,788,881, issued to Owen et al. on Dec. 6, 1988, and assigned to the assignee of the present invention.

Reducing the sensitivity of the gear range indication to variations in position between the indicator and the shift mechanism attaching point is an alternative to adjusting the effective cable length. An example of a gear range indicator employing this approach is provided by U.S. Pat. No. 5,070,808, issued to Poskie on Dec. 19, 1991, and assigned to the assignee of the present invention.

SUMMARY OF THE INVENTION

This invention minimizes the need to provide an adjustment of the effective length of the cable between the shift mechanism and the indicator. This is done by reducing the sensitivity of the gear range indication to variations in distance between the indicator and the shift mechanism attaching point. The sensitivity is reduced by slidingly displacing a pointer relative to fixed gear range symbols, such that the pointer is approximately aligned with the gear range symbol corresponding to the selected gear range while remaining free to float within a predetermined amount of lash. The precise aligning of the pointer with the appropriate gear range symbol is accomplished by a magnetic attraction between the pointer and gear range symbol. This magnetic attraction between the pointer and the symbol is achieved by providing a magnetic element in the pointer and a magnetic element in a base on which the pointer is slidably mounted. A display bearing the symbols is fixed to the base. Supplemental adjustment means, such as that shown in the above U.S. Pat. No. 4,788,881, can be used.

Two embodiments of this concept are described herein and shown in the attached illustrations. Each has a pointer and is slidably mounted relative to positioning means for displacing the pointer. Each also has a base and a display fixed to that base. The positioning means is displaced as a result of shift mechanism movement, the positioning means in turn moving the pointer. The positioning means provides the pointer with some float or lash allowing limited axial movement of the pointer relative to the positioning means in the direction of travel. Once the shift mechanism has been placed in a gear range, the pointer aligns itself with the gear range symbol corresponding to the selected gear ranges by magnetic means.

The first embodiment employs a range bar to displace the pointer with the lash being between the range bar and the pointer. The range bar moves with the shift mechanism to bracket the gear symbol representing the selected gear range. The pointer is aligned by magnetic attraction with the gear range symbol.

The second embodiment displaces the pointer along the length of the gear range indicator by travel limit means affixed to the cable on either side of the pointer. The travel limit means are provided by lugs crimped to the cable.

It is an object of this invention to provide an improved gear range indicator for an automatic transmission in a vehicle, with an operator controlled shift mechanism for shifting the transmission between gear ranges, the gear range indicator having a base, a display symbol for each transmission gear range, positioning means for slidably displacing a pointer relative to the base, this positioning means being mechanically connected to the shift mechanism and translating when the transmission is shifted, the positioning means also providing a predetermined amount of lash between the pointer and itself, the lash generally bracketing the symbol for a selected gear range, the pointer being slidably disposed relative to the base, and the gear range indicator having magnetic means for magnetically biasing the pointer toward the symbol corresponding to the selected gear range.

It is another object of this invention to provide an improved method of installing a gear range indicator in a vehicle comprising mounting the gear range indicator to a point within the vehicle easily seen by the vehicle operator, shifting a shift mechanism to a preselected gear range, aligning a positioning means for slidably displacing a pointer with a symbol corresponding to the preselected gear range, such that a predetermined amount of lash between the pointer and the positioning means is approximately centered about the symbol, and mechanically connecting the positioning means to the shift mechanism.

These and other objects and advantages will be more apparent from the following description and drawings.

DESCRIPTION OF THE DRAWINGS

FIG. 5 is a perspective view of a second embodiment of the gear range indicator as it would be positioned relative to a steering column mounted shift mechanism.

FIG. 6 is a frontal view of a second embodiment of the gear range indicator.

FIG. 7 is a perspective view of a toothed sleeve fixed to a shift mechanism with a toothed tab positioned for insertion into the toothed sleeve.

DESCRIPTION OF THE PREFERRED EMBODIMENT

Figure 1:
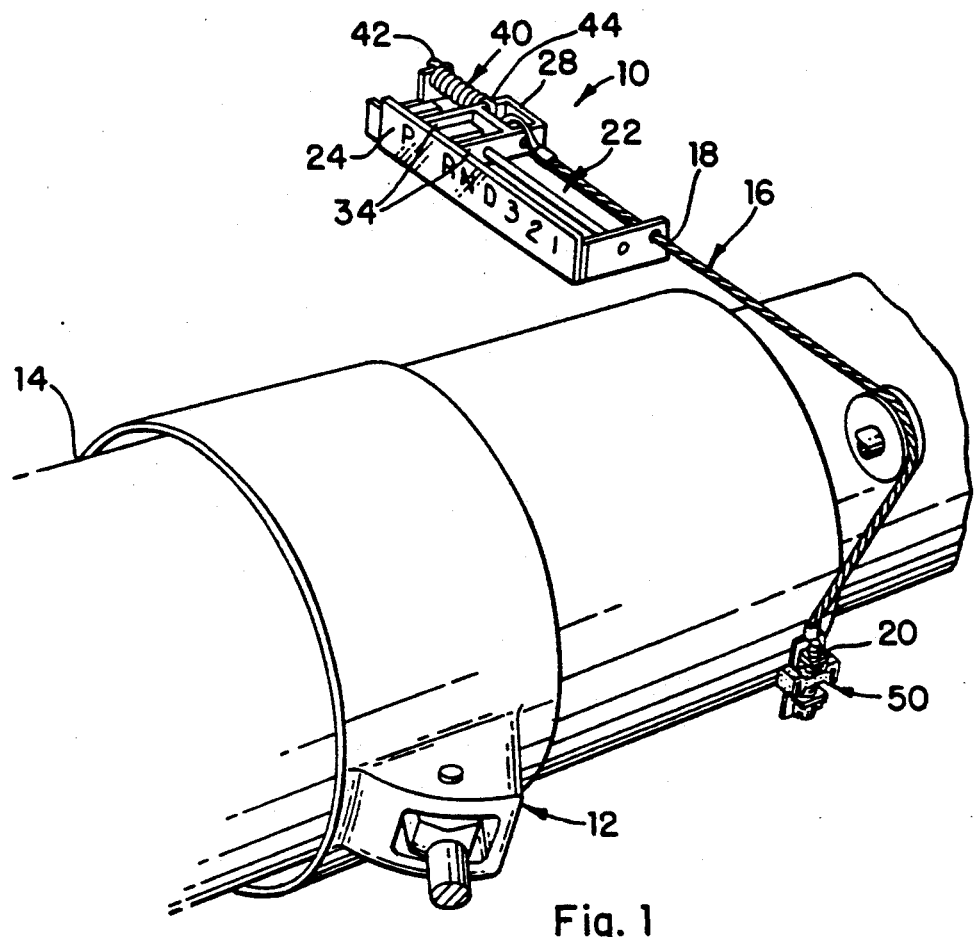
FIG. 1 is a perspective view of a first embodiment of the gear range indicator as it would be positioned relative to a steering column mounted shift mechanism.

FIGS. 1 and 5 show a first embodiment and a second embodiment, respectively, of a gear range indicator 10, 110 oriented as it would be in a vehicle. The externals of a shift mechanism 12, 112 are shown without showing the connection to a transmission. The gear range indicator 10, 110 is shown as being positioned above a steering column 14, 114, as would be the case if the gear range indicator 10, 110 were mounted in a dashboard of the vehicle. A shift cable 16, 116, serving as a connecting means for mechanically connecting the gear range indicator to the shift mechanism, is attached on a first end 18, 118 to the gear range indicator 10, 110, and on a second end 20, 120 to the shift mechanism 12, 112. The shift mechanism 12, 112 may be constructed similar to the column mounted mechanism shown in U.S. Pat. No. 2,925,061 to Thornburgh et al., issued Feb. 16, 1960, and assigned to the assignee of the present invention.

Figure 2:
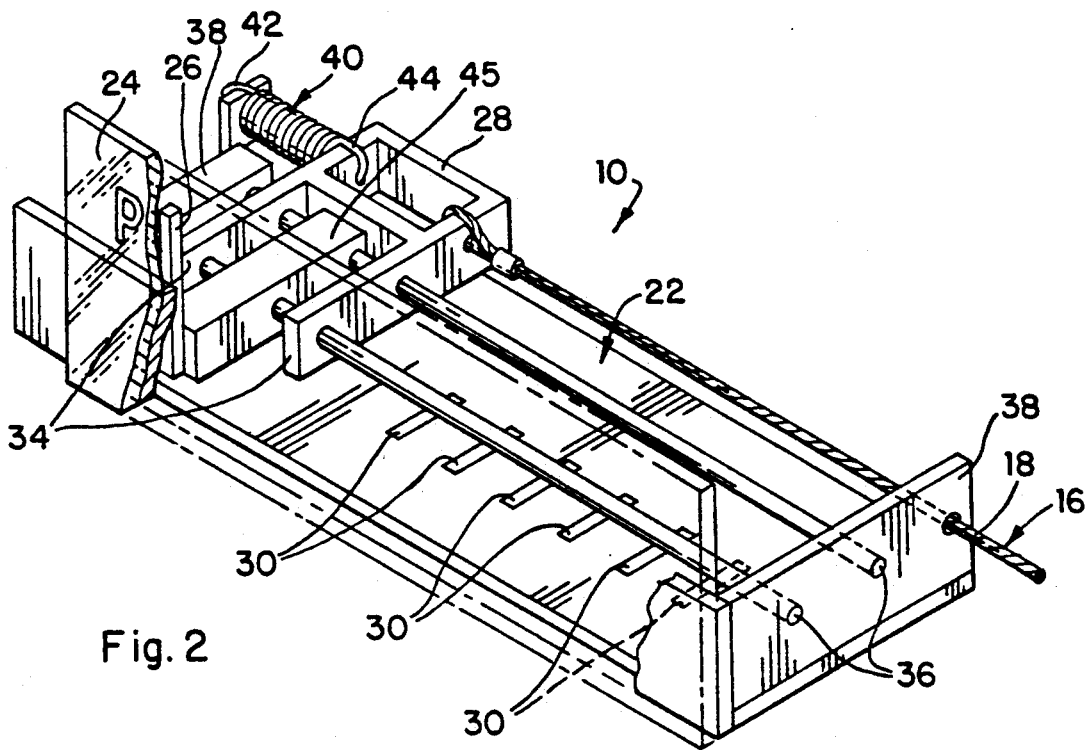
FIG. 2 is a perspective view of the first embodiment of a gear range indicator.
Figure 4:
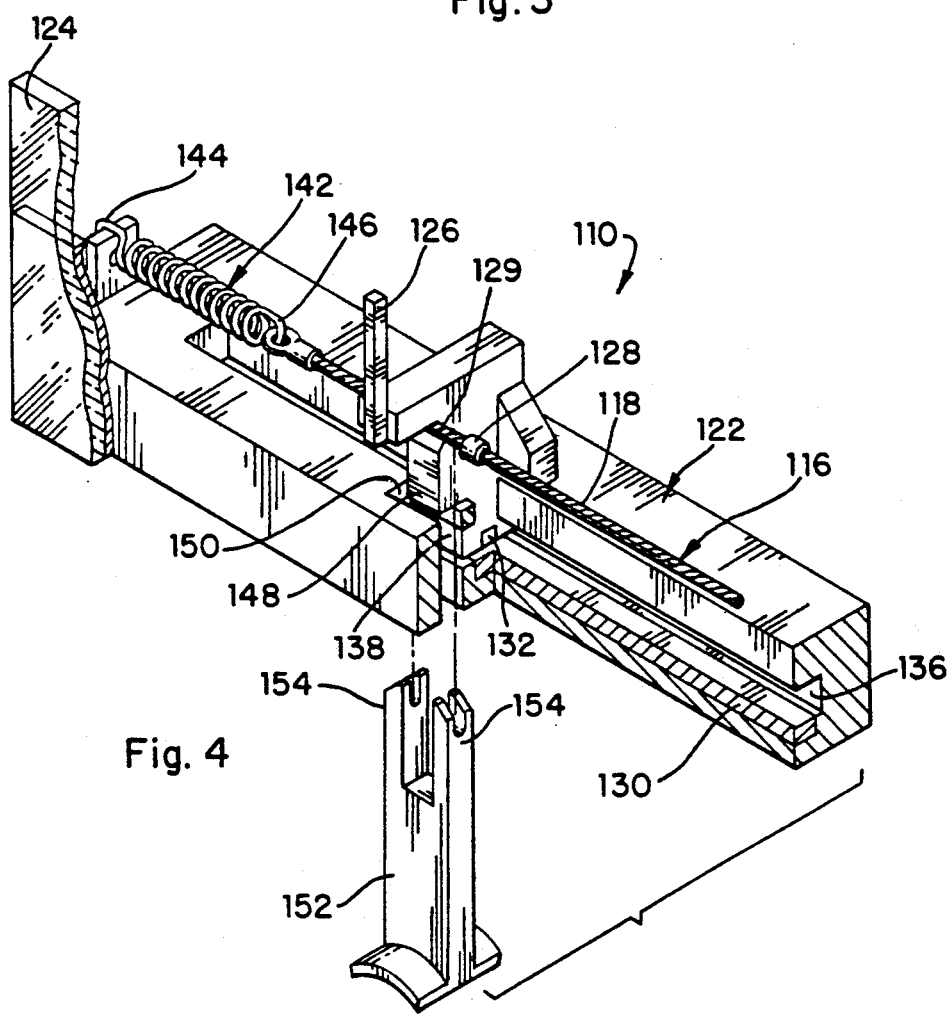
FIG. 4 is an enlarged perspective view of the second embodiment of the gear range indicator.

The details of the two configurations of the gear range indicator 10, 110 are better seen in FIGS. 2 and 4. The gear range indicator 10, 110 has a base 22, 122 with a display 24, 124 fixed to it. The display 24, 124 is transparent and bears a symbol ("P" Park, "R" Reverse, "N" Neutral, "D" Drive, and other forward drive ranges "3", "2", and "1") for each transmission gear range. A pointer 26, 126 is slidably disposed relative to the base 22, 122 and the display 24, 124 for movement between the symbols. Positioning means for slidably displacing the pointer 26, 126 relative to the base 22, 122 is provided by a range bar 28 in the first embodiment and by lugs 128 fixed to an indicator cable 129 in the second embodiment. The positioning means traps the pointer 26, 126. The positioning means is mechanically connected to the shift mechanism 12, 112 and translates relative to the base 22, 122 when the transmission is shifted. The positioning means provides a predetermined amount of lash between the pointer 26, 126 and itself, such that the lash generally brackets the symbol for a selected transmission gear range.

Figure 3:
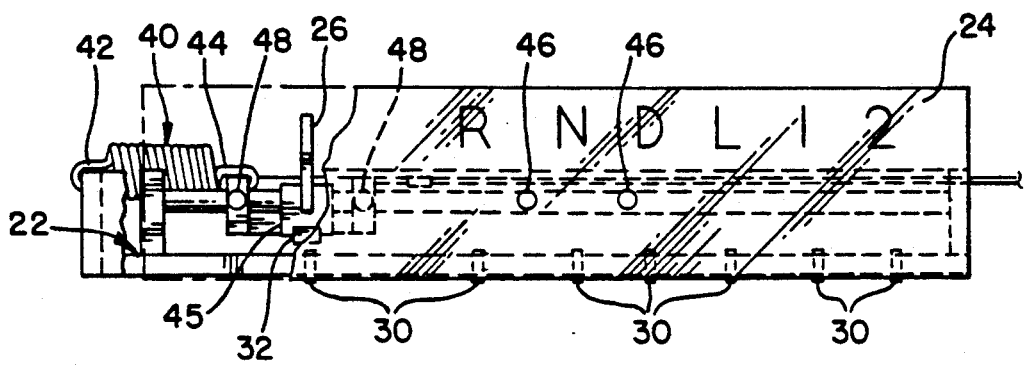
FIG. 3 is a frontal view of the first embodiment of the gear range indicator.

Magnetic means for biasing the pointer 26, 126 toward the symbol corresponding to the selected transmission gear range is provided by a complement of ferrous elements 30 in the base 22 in the first embodiment and a ceramic magnet 130 in the second embodiment, and by a ferrous magnet 32, 132 in the pointer 26, 126 in both the first and second embodiment, best seen in FIGS. 3 and 6.

In the first embodiment, the range bar 28 traps the pointer 26 between a pair of tines 34. Both the range bar 28 and the pointer 26 are slidably disposed on a pair of parallel shafts 36. The shafts 36 are supported by and fixed to end plates 38 at opposite ends of the base 22. The shift cable 16 attaches to the range bar 28. A spring 40, maintaining the shift cable 16 in tension, has a first end 42 fixed relative to the base 22, and a second end 44 fixed relative to the range bar 28. The ferrous magnet 32 is fixed to a bottom 45 of the pointer 26. The ferrous elements 30 are embedded in the base 22. The ferrous elements 30 are generally aligned with each of the display symbols and are affixed to the base 22 by heat staking. The base 22 is made of plastic or alternatively provided with a plastic portion to accommodate heat staking.

Two aligner marks 46 on the display 24 bracket the Neutral symbol N. Two aligner marks 48 on the range bar 28 are aligned with the marks 46 on the display 24 during the installation of the gear range indicator 10 to center the lash provided by the range bar 28 relative to the Neutral symbol N. This alignment is accomplished by providing an adjusting means 50 between where the shift cable 16 is fixed to the shift mechanism 12 and where it attaches to the gear range indicator 10. The adjusting means 50 can be provided by a device like that shown in the above U.S. Pat. No. 4,788,881.

The gear range indicator 10 is installed in a vehicle by mounting it in the dashboard (not shown). The shift mechanism 12 is placed in the Neutral position. The shift cable 16 is routed to the shift mechanism 12. The adjusting means 50 is fixed to the shift mechanism 12 and the shift cable 16 attached to it. The adjusting means 50 is adjusted until the range aligner bar marks 48 are aligned with the aligner marks 46 on the display 24. The installation of the gear range indicator 10 now is complete.

As the shift mechanism 12 is moved to another transmission gear range position, such as Park, the spring 40 continues to exert a force against the range bar 28, maintaining the shift cable 16 in tension. The pointer 26 moves with the range bar 28. The range bar 28 is moved into alignment with the Park symbol P. The pointer 26 is magnetically biased to align itself with the P. The magnetic attraction between the magnet 32 in the bottom 45 of the pointer 26 draws it toward the ferrous element 30 aligned with the P in the base 22 of the gear range indicator 10.

A second embodiment of the invention is shown in FIGS. 4-6. The pointer 126 is slidably disposed on the indicator cable 129, as well as being slidably disposed relative to the base 122. The pointer 126 is shown as being in a T-slot relation with the base 122, with a T-slot 136 provided in the base 122, and a portion of the pointer 126 having a T-shape 138. It is readily apparent that other configurations besides the T-slot 136 would accommodate the sliding relationship equally well.

Two lugs 128 are fixed to the indicator cable 129 on both sides of the pointer 126, and serve as travel limit means for the pointer 126. The lugs 128, together with the indicator cable 129, provide the positioning means, thereby defining the lash between the pointer 126 and the positioning means. A spring 142 is disposed between the indicator cable 129, and the base 122 with a first end 144 fixed relative to the base 122 and a second end 146 fixed relative to the indicator cable 129. The indicator cable 129 is shown here as being integral with the shift cable 116.

The ferrous magnet 132 in the pointer 126 is attached to a bottom 148 of the pointer 126. The ceramic magnet 130 is disposed in the bottom of the T-slot 136. Ceramic magnets are commonly employed as refrigerator magnets bearing promotional advertising. The ceramic magnet 130 is polarized at locations along its length to bias the pointer 126 toward the symbols for the gear range positions. The ceramic magnet 130 can be shaped so as to be consistently oriented in a desired position relative to the base 122.

The base 122 has an opening 150 to accommodate an aligner clip 152 in the Neutral position. The aligner clip 152 is clipped to the indicator cable 129 between the lugs 128 and slidably displaces the pointer 126 to center it in the available lash. The pointer 126 is sandwiched between two prongs 154 of the clip 152. The clip 152 remains in the gear range indicator 110 until after the gear range indicator 110 has been installed in the vehicle. The clip 152 is best seen in FIG. 4.

The second configuration of the gear range indicator 110 is installed in a vehicle by mounting it in the dashboard, just as with the first configuration. The shift mechanism 112 is placed in the Neutral position.

With the clip 152 still holding the pointer 126 in the Neutral position, the shift cable 116 is tensioned and attached to the shift mechanism 112. One way of accomplishing this simultaneous tensioning and attaching is to provide a toothed tab 156 on the end of the shift cable 116. The toothed tab 156 is inserted into a toothed sleeve 158 which is fixed to the shift mechanism 112, thereby fixing the shift cable 116 to the shift mechanism 112. The tab 156 and sleeve 158 are best seen in FIG. 7.

After the shift cable 116 has been attached to the shift mechanism 112, the aligner clip 152 is removed. The pointer 126 remains centered with the Neutral symbol N because of the magnetic interaction between the magnet 132 in the pointer 126 and the ceramic magnet 130 in the base 122. When the shift mechanism 112 is moved to another gear range position, such as Park, the spring 142 keeps the shift cable 116 in tension, displacing the lugs 128 toward the Park symbol P. The pointer 126 moves with the lugs 128 on the shift cable 116. The lash provided by the lugs 128, brackets the Park symbol P. The pointer 126 is magnetically biased into alignment with the Park symbol P.

Other configurations of the present invention are readily apparent. Use of a ceramic magnet with the first configuration, and the use of a ferrous element in place of the ceramic magnet with the second configuration, are but two such configurations.

Obviously, many modifications and variations of the present invention are possible in light of the above teaching. It is therefore to be understood, that within the scope of the appended claims, the invention may be practiced otherwise than as specifically described.

What is claimed is:

The embodiments of the invention in which an exclusive property or privilege is claimed are defined as follows:

1. A gear range indicator for an automatic transmission in a vehicle with an operator controlled shift mechanism for shifting the transmission between gear ranges, the gear range indicator comprising:
   a base;
   a display, having a symbol for each transmission gear range, being fixed relative to the base;
   positioning means for slidably displacing a pointer relative to the base, being mechanically connected to the shift mechanism, translating when the transmission is shifted, providing a predetermined amount of lash between the pointer and the positioning means, the lash generally bracketing the symbol for a selected gear range connecting means for mechanically connecting the positioning means to the shift mechanism
   the pointer, being slidably disposed relative to the base and positioning means; means for maintaining tension on said connecting means; and
   magnetic means for magnetically biasing the pointer toward the symbol corresponding to the selected gear range.

2. A gear range indicator as recited in claim 1, wherein the magnetic means for biasing the pointer toward the symbol corresponding to the selected gear range includes a ferrous element in the pointer.

3. A gear range indicator as recited in claim 2, wherein the ferrous element in the pointer is a magnet.

4. A gear range indicator for an automatic transmission in a vehicle with an operator controlled shift mechanism for shifting the transmission between gear ranges, the gear range indicator comprising:
   a base;
   a display, having a symbol for each transmission gear range, being fixed relative to the base;
   the pointer, being slidably disposed relative to the base and having a magnet fixed to it;
   positioning means for slidably displacing the pointer relative to the base, being mechanically connected to the shift mechanism, translating when the transmission is shifted, providing a predetermined amount of lash between the pointer and the positioning means, the lash generally bracketing the symbol for the selected gear range; connecting means for mechanically connecting the positioning means to the shift mechanism; means for maintaining tension on said connecting means and
   a magnetically interacting element fixed relative to the base biasing the pointer toward the symbol corresponding to the selected gear range.

5. A gear range indicator as recited in claim 4, further comprising:
   a ceramic magnet, providing the base portion of the magnetic means, the ceramic magnet being polarized along its length to bias the magnet in the pointer toward the symbols, the ceramic magnet being configured so as be oriented only one way relative to the base.

6. A gear range indicator as recited in claim 5, further comprising:
   said tension maintaining means comprising a spring having a first end and a second end, the first end being fixed relative to the base;
   an indicator cable being fixed relative to the second end of the spring, the pointer being slidably disposed along the indicator cable;
   cable lugs fixed tot eh indicator cable on each side of the pointer and acting with the indicator cable to provide the positioning means.

7. A gear range indicator as recited in claim 6, further comprising:
   an aligner clip having two prongs adapted to removably clip to the indicator cable between the lugs and to sandwich the pointer between the prongs thereby centering the pointer midway between the lugs.

8. A gear range indicator as recited in claim 4, further characterized by the magnetically interacting element comprising a complement of ferrous elements fixed to the base.

9. A gear range indicator as recited in claim 8, further comprising:
   a range bar slidably disposed relative to the base for movement between the symbols and having two tines with one on each side of the pointer providing the positioning means; and
   said tension maintaining means comprising a spring having a fist end and second end, the first end being fixed relative to the base and the second end being fixed relative to the range bar.

10. A gear range indicator as recited in claim 9, further comprising:

the base being plastic where the ferrous elements are fixed; and the ferrous elements being fixed to the plastic portion by heat staking.

11. A gear range indicator as recited in claim 10, further comprising:

an aligner mark on the display and an aligner mark on the range bar.

12. A method o installing a gear range indicator having a base;

a display, having a symbol for each transmission gear range fixed relative to the base;

the pointer, being slidably disposed relative to the base and having a magnet fixed to it;

positioning means for slidably displacing the pointer relative to the base, being mechanically connected to the shift mechanism, translating when the transmission is shifted, providing a predetermined amount of lash between the pointer and the positioning means, the lash generally bracketing the symbol for the selected gear range;

a spring disposed between the positioning means and the base; and a magnetically interacting element fixed relative to the base biasing the pointer toward the symbol corresponding to the selected gear range in a vehicle comprising:

aligning the positioning means with the symbol corresponding to a preselected gear range;

installing in the gear range indicator an aligner clip adapted to center the pointer relative to the positioning means in the gear range indicator thereby centering the pointer of the gear range indicator relative to the positioning means;

mounting the gear range indicator to the vehicle in a location easily seen by a vehicle operator;

shifting a shift mechanism in the vehicle to the preselected gear range;

installing a shift cable between the positioning means and the shift mechanism;

tensioning the shift cable to eliminate slack therein; and removing the aligner clip.

13. A method of installing a gear range indicator in a vehicle as recited in claim 12, further comprising:

providing a toothed tab fixed to an end of the shift cable at the shift mechanism; and inserting the toothed tab into a toothed sleeve fixed to the shifter mechanism, thereby fixing the shift cable to the shift mechanism.

* * * * *